F. DONOHUE.
Harrows.
No. 155,830. Patented Oct. 13, 1874.
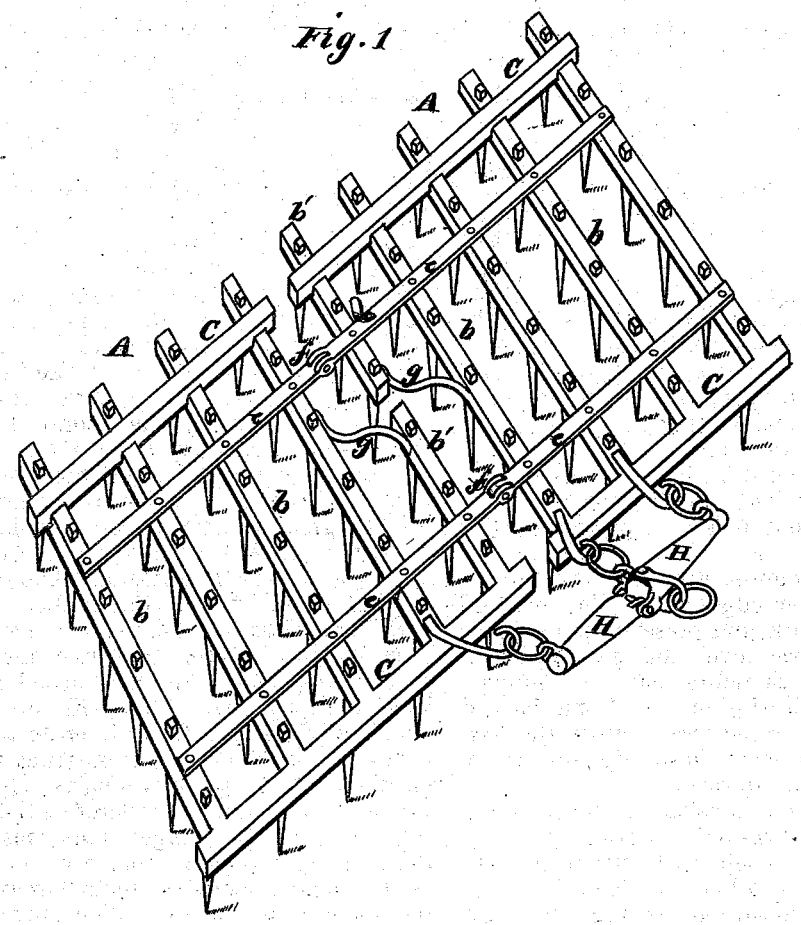
Witnesses
Geo. H. Strong
C. M. Richardson
Inventor
Frank Donohue
By his Atty's
Dewey & Co.

UNITED STATES PATENT OFFICE.

FRANK DONOHUE, OF MOUNTAIN VIEW, CALIFORNIA.

IMPROVEMENT IN HARROWS.

Specification forming part of Letters Patent No. 155,830, dated October 13, 1874; application filed April 15, 1874.

*To all whom it may concern:*

Be it known that I, FRANK DONOHUE, of Mountain View, Santa Clara county, State of California, have invented an Improved Harrow; and I do hereby declare the following description and accompanying drawings are sufficient to enable any person skilled in the art or science to which it most nearly appertains to make and use my said invention or improvement without further invention or experiment.

In harrowing plowed ground it is desirable to keep the outer edges of the harrow well down to their work, and preserve as nearly as possible a uniform level and penetration of the teeth. It is therefore usual to employ a weight upon each wing of a sectional harrow or secure a bar transversely across the harrow in order to prevent these outer edges from riding or buckling upward.

My improvement consists in constructing the harrow so that the outer edges of the wings will keep down to their work without the aid of a weight, bar, or other contrivance.

Referring to the accompanying drawings, Figure 1 is a perspective view of my harrow.

A A are the two hinged sections of a double harrow. Each section is rhomboidal in shape, and consists of as many parallel timbers $b\ b$ as desired, which serve to hold the harrow-teeth in the usual way. These timbers are united together at or near each end by a transverse timber, C. At one side of each section I secure a partial parallel timber, $b'$, so that when two rhomboidal sections are placed together in the manner of uniting the two sections of a harrow the two partial timbers $b'$ of the two sections will stand in the same line and will, in effect, be a divided timber in the middle of the harrow. The hinge straps or plates $e$ are secured upon the parallel timbers $b$ and $b'$, so that the hinges $f$, at the opposite ends of the harrow, will come on opposite sides of the divided timbers $b'$. If a line should now be drawn through the two hinges it would cut the harrow into two trapezoidal figures, thus causing the weight of the corners or acute angles to be nearly at right angles to the breaking line or joints of the two hinges, so that their superior leverage, owing to their greater distance from the hinges, will cause them to keep closely down to the ground when the harrow is working. The broken or divided ends of the partial timbers $b'$ are secured by braces $g$ to the next timber $b$ in the same section, in order to stiffen and support them. The double-tree H is attached to the harrow, so that its middle will be in a line with the two hinges $f$, and in order to accommodate it to the harrow I construct it in two parts, and hinge these two parts together, as shown. The draft will, therefore, be in a direct line with the hinges, and consequently the sections will have equal rise and fall, and as the diagonal corners are farther away from the line of draft than any other portion of the harrow, they will keep close to the ground.

Having thus described my invention, what I claim, and desire to secure by Letters Patent, is—

A harrow, composed of the rhomboidal sections A A, with their partial or divided timbers $b'$, united by hinges $f$ upon opposite sides of the divided timber, substantially as and for the purpose above described.

In witness whereof I hereunto set my hand and seal.

FRANK DONOHUE. [L. S.]

Witnesses:
   THOMAS STEALEY,
   WILLIAM CARTIAN.